US012646662B2

(12) United States Patent
Chiasson et al.

(10) Patent No.: US 12,646,662 B2
(45) Date of Patent: Jun. 2, 2026

(54) TRIGGER ACTIVATED TOOLS HAVING ACTIVATION LOCKOUTS

(71) Applicant: HUBBELL INCORPORATED, Shelton, CT (US)

(72) Inventors: Mark Andrew Chiasson, Merrimack, NH (US); Thomas Romeo Faucher, Manchester, NH (US); John Lefavour, Litchfield, NH (US); Robert Poirier, Bedford, NH (US); Peter Matthew Wason, Manchester, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 351 days.

(21) Appl. No.: 17/823,459

(22) Filed: Aug. 30, 2022

(65) Prior Publication Data

US 2022/0415584 A1 Dec. 29, 2022

Related U.S. Application Data

(62) Division of application No. 17/169,292, filed on Feb. 5, 2021, now Pat. No. 11,430,616, which is a division (Continued)

(51) Int. Cl.
*H01H 3/20* (2006.01)
*B25F 5/00* (2006.01)

(Continued)

(52) U.S. Cl.
CPC ................. *H01H 3/20* (2013.01); *B25F 5/00* (2013.01); *B25F 5/02* (2013.01); *B26B 15/00* (2013.01);

(Continued)

(58) Field of Classification Search
CPC .. H01H 3/20; H01H 9/24; H01H 9/06; H01H 21/20; H01H 9/287; H01H 13/08; H01H 9/20; B25F 5/00; B25F 5/02; B26B 15/00
See application file for complete search history.

(56) References Cited

U.S. PATENT DOCUMENTS 2,080,202 A * 5/1937 Drake ..................... F41A 17/54 42/70.07
3,142,227 A * 7/1964 Stringer .................. F41A 19/07 200/334

(Continued)

FOREIGN PATENT DOCUMENTS

CN 1674182 9/2005
CN 101541362 9/2009

(Continued)

OTHER PUBLICATIONS

Merriam-Webster, "internal" definition, available at https://www.merriam-webster.com/dictionary/internal?src=search-dict-box, on Dec. 4, 2025.*

(Continued)

*Primary Examiner* — Jonathan G Riley
(74) *Attorney, Agent, or Firm* — Ruggiero McAllister & McMahon LLC; Edward L McMahon

(57) ABSTRACT

Trigger activated tools are provided that have one or more activation lockouts. The activation lockouts include electrical resets, variable position lockouts, mechanical lockouts, shield lockouts, and any combinations thereof.

22 Claims, 11 Drawing Sheets

Related U.S. Application Data of application No. 16/788,953, filed on Feb. 12, 2020, now Pat. No. 10,943,746, which is a division of application No. 15/067,538, filed on Mar. 11, 2016, now Pat. No. 10,600,584.

(60) Provisional application No. 62/131,596, filed on Mar. 11, 2015.

(51) Int. Cl.

| | |
|---|---|
| ***B25F 5/02*** | (2006.01) |
| ***B26B 15/00*** | (2006.01) |
| ***H01H 9/06*** | (2006.01) |
| ***H01H 9/24*** | (2006.01) |
| ***H01H 21/20*** | (2006.01) |
| ***H01H 21/24*** | (2006.01) |

(52) U.S. Cl.

CPC ................. *H01H 9/24* (2013.01); *H01H 9/06* (2013.01); *H01H 2009/065* (2013.01); *H01H 21/20* (2013.01); *H01H 21/24* (2013.01)

(56) References Cited

U.S. PATENT DOCUMENTS

| | | | | |
|---|---|---|---|---|
| 4,399,340 | A * | 8/1983 | Crandall | H01H 3/20 200/522 |
| 4,879,438 | A * | 11/1989 | Winchester | H01H 9/06 310/50 |
| 4,967,474 | A | 11/1990 | Wells | |
| 5,161,679 | A * | 11/1992 | Russo | H01H 3/20 200/332.2 |
| 5,483,727 | A * | 1/1996 | Chang | F16P 3/00 83/477.1 |
| 5,553,478 | A * | 9/1996 | Di Troia | H01R 43/0427 72/1 |
| 6,479,958 | B1 | 11/2002 | Thompson | |
| 7,004,367 | B1 | 2/2006 | Shen | |
| 7,640,780 | B2 * | 1/2010 | Ruland | H01R 43/0427 72/453.18 |
| 7,788,962 | B2 | 9/2010 | Chiasson | |
| 7,926,321 | B2 | 4/2011 | Rollins | |
| 10,093,010 | B2 | 10/2018 | Chiasson | |
| 2002/0134811 | A1 * | 9/2002 | Napier | B24B 23/04 227/134 |
| 2005/0183317 | A1 * | 8/2005 | Finn | F41A 19/11 42/72 |
| 2005/0205406 | A1 | 9/2005 | Wong | |
| 2006/0011361 | A1 * | 1/2006 | Shimma | H01H 9/06 173/48 |
| 2006/0054651 | A1 | 3/2006 | Shen | |
| 2008/0011592 | A1 | 1/2008 | Liebert | |
| 2011/0048098 | A1 * | 3/2011 | Rollins | H01R 43/0427 29/428 |
| 2012/0000682 | A1 | 1/2012 | Grazioli | |
| 2013/0081525 | A1 | 4/2013 | Moreno | |

FOREIGN PATENT DOCUMENTS

| | | | |
|---|---|---|---|
| CN | 102328306 | | 1/2012 |
| DE | 2022038 | A1 * | 11/1971 |
| WO | 03/061913 | | 7/2003 |

OTHER PUBLICATIONS

Merriam-Webster, "remote" definition, available at: https://www.merriam-webster.com/dictionary/remote, on Dec. 4, 2025.*

International Search Report from corresponding International Application PCT/US2016/021981 dated May 17, 2016.

Written Opinion from corresponding International Application PCT/US2016/021981 dated May 17, 2016.

Chinese Office Action from corresponding Chinese Application 201680014889.6 dated Aug. 21, 2018.

* cited by examiner

TRIGGER ACTIVATED TOOLS HAVING ACTIVATION LOCKOUTS

CROSS REFERENCE TO RELATED APPLICATIONS

This application is a divisional of U.S. application Ser. No. 17/169,292 filed on Feb. 5, 2021, which is a divisional of U.S. application Ser. No. 16/788,953 filed on Feb. 12, 2020 that issued as U.S. Pat. No. 10,943,746 on Mar. 9, 2021, which is a divisional of U.S. application Ser. No. 15/067,538 filed Mar. 11, 2016 that issued as U.S. Pat. No. 10,600,584 on Mar. 24, 2020, which claims the benefit of U.S. Provisional Application 62/131,596 filed Mar. 11, 2015, the entire contents of all of which are incorporated by reference herein.

BACKGROUND

1. Field of the Disclosure

The present disclosure is related to trigger activated tools. More particularly, the present disclosure is related to trigger activated tools having activation lockouts.

2. Description of Related Art

Trigger activated tools are commonly used in the industrial, energy, construction, telecommunications, petrochemical, data center, transportation and construction industries. Such tools can include, but are not limited to, C-Head crimping tools, jaw crimping tools, cutter tools and others.

When activation of such tools is desired, the trigger is moved from a normal position to an activation position. Unfortunately, the use of such trigger activated tools often occurs under conditions that can lead to inadvertent movement of the trigger from the normal position to the activation position.

Accordingly, it has been determined by the present disclosure that there is a need for trigger activated tools that overcome, alleviate, and/or mitigate one or more of the aforementioned and other deleterious effects of prior art trigger activated tools.

SUMMARY

Trigger activated tools are provided that include activation lockouts, which prevent inadvertent activation of the tools.

In some embodiments, the activation lockout is an electrical reset. Unless the electrical reset has been pressed, the trigger—regardless of whether in the normal position or the activation position—is prevented from activating the tool.

In other embodiments, the activation lockout is a variable position lockout that has a first position and a second position. The variable position lockout, when in the first position, allows movement of the trigger to the activation position, but prevents such movement from activating the tool. Conversely, the variable position lockout, when in the second position, allows movement of the trigger to the activation position to activate the tool.

In some embodiments, the activation lockout is a mechanical lockout that has a first position and a second position. The mechanical lockout, when in the first position, prevents the trigger from being moved to the activation position. Conversely, the mechanical lockout, when in the second position, allows the trigger to be moved to the activation position to activate the tool.

In still other embodiments, the activation lockout is a shield lockout that has a first position and a second position. The shield lockout, when in the first position, covers or otherwise shields the trigger from being moved to the activation position. Conversely, the shield lockout, when in the second position, allows access to the trigger so that the trigger can be moved to the activation position to activate the tool.

A trigger activated tool is provided that includes an activatable device, an activation trigger, and a lockout. The activation trigger depends from a handle portion and is configured to activate the activatable device. The lockout has a locked state and an unlocked state, where the locked state prevents activation of the activatable device by the activation trigger.

In some embodiments either alone or in combination with the afore or aft mentioned embodiments, the trigger activated tool can include a drain trigger depending from the handle portion. The drain trigger relieves potential energy within the activatable device when the lockout is in both the locked and unlocked states.

In some embodiments either alone or in combination with the afore or aft mentioned embodiments, the lockout is normally biased to the locked state.

In some embodiments either alone or in combination with the afore or aft mentioned embodiments, the activatable device includes a power source. The activation trigger moves between a first position in which the power source is not in communication with the activatable device and a second position in which the power source is in communication with the activatable device. The lockout is a reset that selectively prevents communication of the power source and the activatable device when the activation trigger is in the second position unless the reset is in the unlocked state.

In some embodiments either alone or in combination with the afore or aft mentioned embodiments, the trigger activated tool can include a control circuit in communication with the reset. The control circuit maintaining the lockout in the unlocked state for a predetermined time period after movement of the reset.

In some embodiments either alone or in combination with the afore or aft mentioned embodiments, the lockout is a variable position lockout such that the locked state is a first position and the unlocked state is a second position.

In some embodiments either alone or in combination with the afore or aft mentioned embodiments, the variable position lockout, when in the first position, allows movement of the activation trigger, but prevents such movement from activating the activatable device and, when in the second position, allows movement of the activation trigger to activate the activatable device.

In some embodiments either alone or in combination with the afore or aft mentioned embodiments, the variable position lockout includes an L-shaped lever rotationally secured to the activation trigger for movement between the first position and the second position. The L-shaped lever having an activation arm and a drain arm. The drain arm, when the L-shaped lever is in the first position, is aligned with a drain trigger such that movement of the activation trigger causes the drain arm to activate the drain trigger to relieve potential energy within the activatable device. The activation arm, when the L-shaped lever is in the second position, is aligned with an activation switch such that movement of the activation trigger causes the activation arm to activate the activation switch to activate the activatable device.

In some embodiments either alone or in combination with the afore or aft mentioned embodiments, the lockout is a mechanical lockout such that the locked state is a first position and the unlocked state is a second position.

In some embodiments either alone or in combination with the afore or aft mentioned embodiments, the mechanical lockout, when in the first position, prevents movement of the activation trigger and, when in the second position, allows movement of the activation trigger.

In some embodiments either alone or in combination with the afore or aft mentioned embodiments, the mechanical lockout, when in the first position, contacts an interior of the handle portion or an external portion of the handle portion.

In some embodiments either alone or in combination with the afore or aft mentioned embodiments, the lockout is a shield lockout such that the locked state is a first position and the unlocked state is a second position.

In some embodiments either alone or in combination with the afore or aft mentioned embodiments, the shield lockout, when in the first position, covers or shields the activation trigger to prevent movement of the activation trigger and, when in the second position, allows access to the activation trigger to allow movement of the activation trigger.

In some embodiments either alone or in combination with the afore or aft mentioned embodiments, the handle portion is a pistol grip and the shield lockout is a swiveling guard or is an inline grip and the shield lockout is a pivoting cover.

In other embodiments, a trigger activated tool is provided. The tool includes a jaw, a power source, a hydraulic unit operatively connected with the jaw, a handle portion having an activation trigger and a drain trigger depending therefrom, and a trigger lock rotatably secured in the activation trigger. The activation trigger moves between a normal position and an activated position. The activation trigger, when in the activated position, places the hydraulic unit in electrical communication with the battery such that the hydraulic unit moves the jaw. The drain trigger moves between a normal position and a drain position. The drain trigger, when in the drain position, relieves potential energy within the hydraulic unit. The trigger lock moves between a normal position and an activation position. The activation trigger, the drain trigger, and the trigger lock each is biased to the normal positions, respectively. The trigger lock, when in the normal position, provides a mechanical interference to prevent movement of the activation trigger to the activated position and, when in the activation position, allows movement of the activation trigger to the activated position.

In some embodiments either alone or in combination with the afore or aft mentioned embodiments, the handle portion is an inline grip or a pistol grip.

In some embodiments either alone or in combination with the afore or aft mentioned embodiments, the drain trigger moves between the normal position and the drain position when the trigger lock is in both the normal and activation positions.

In some embodiments either alone or in combination with the afore or aft mentioned embodiments, the mechanical interference is internal to the handle portion or external to the handle portion.

The above-described and other features and advantages of the present disclosure will be appreciated and understood by those skilled in the art from the following detailed description, drawings, and appended claims.

DETAILED DESCRIPTION

Figure 1:
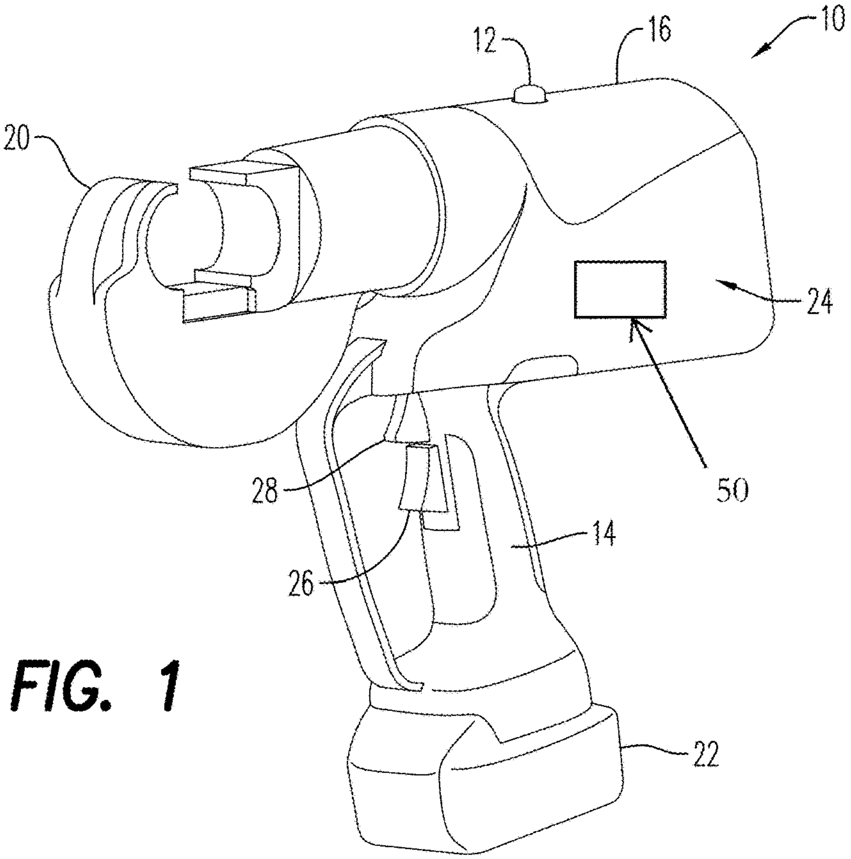
FIG. 1 is a top perspective view of a pistol style trigger activated tool having an exemplary embodiment of an electrical reset lockout according to the present disclosure.
Figure 2:
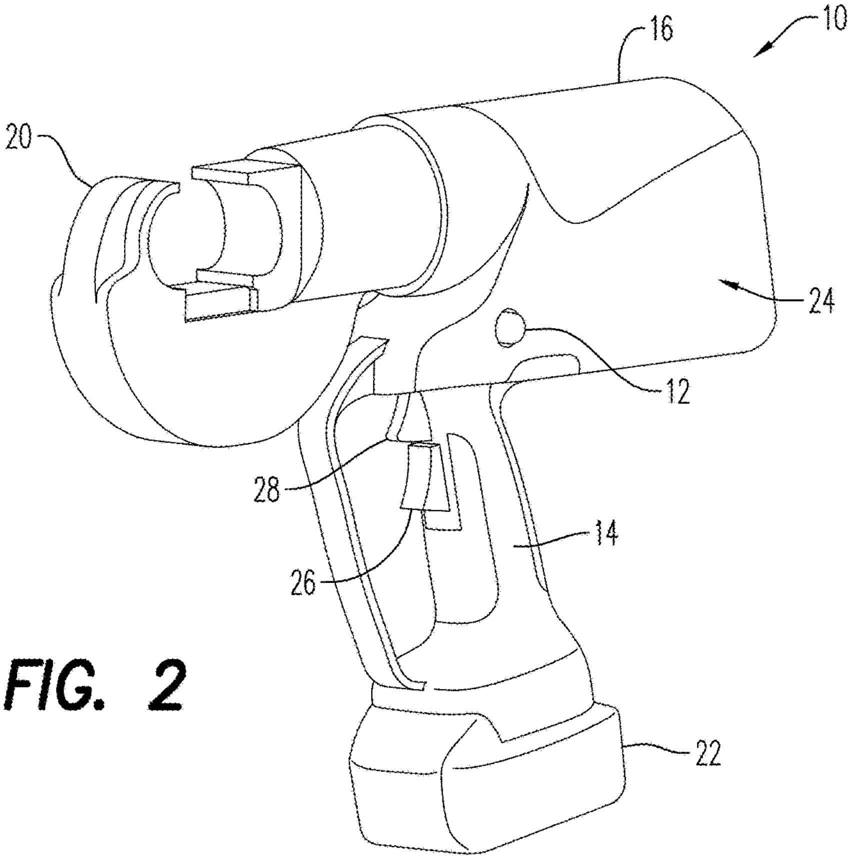
FIG. 2 is a top perspective view of an alternate exemplary embodiment of the electrical reset of FIG. 1.

Referring to the drawings and in particular to FIGS. 1 and 2, exemplary embodiments of a pistol style trigger activated tool according to the present disclosure is shown and is generally referred to by reference numeral 10.

Advantageously, tool 10 includes an activation lockout 12, which prevent inadvertent activation of the tool. Here, activation lockout 12 is an electrical reset lockout that allows movement of the activation trigger from the normal position to the activation position, but prevents such movement from activating tool 10 unless the activation lockout has been pressed. In this manner, activation lockout 12—when in the form of the electrical reset lockout—prevents inadvertent activation of tool 10 by requiring both pressing of the lockout and activation of the trigger.

In the embodiment of FIG. 1, activation lockout 12 is positioned at on a handle portion of tool 10, illustrated as an upper wall 14. In this manner, the user can hold tool 10 with a first hand on pistol style grip 16 and a second hand to steady the tool by holding upper wall 14 of the tool—with easy access to activation lockout 12 via their second hand.

In the embodiment of FIG. 2, activation lockout 12 is positioned at a side wall 18 of tool 10, where the side wall is sufficiently proximate to grip 16. In this manner, the user can again hold tool 10 with their first hand on pistol style grip 16 and their second hand to steady the tool by holding upper wall 14 of the tool—with easy access to activation lockout 12 via the thumb of their first hand. While tool 10 is illustrated in FIG. 2 with activation lockout 12 on the left side wall 18 for activation by the thumb of the user's right hand. It is also contemplated by the present disclosure for tool 10 to be configured with activation lockout 12 on the right side wall 18 for left handed operation, or on both the left and right side walls.

Tool 10 will be described in more detail with simultaneous reference to FIGS. 1 and 2. Tool 10 includes an activatable device, which is in this embodiment illustrated as including a jaw 20, a battery 22, and a hydraulic unit 24. Jaw 20 can be a crimping jaw or a cutting jaw, as well as any other jaw.

Hydraulic unit 24 is a self-contained battery operated unit, which is configured to actuate causing jaw 20. Hydraulic unit 24 includes an activation trigger 26 and a drain trigger 28 that depend and/or extend from the handle portion.

Activation trigger 26 moves between a normal position (shown) and a depressed or activated position (not shown). Tool 10 is activated by moving activation trigger 26 from the normal position to the activated position, which places battery 22 in electrical communication with hydraulic unit 24 to actuate jaw 20.

It should be recognized that tool 10 is described by way of example only as having the activatable device illustrated as a combination of jaw 20, battery 22, and hydraulic unit 24. Of course, it is contemplated by the present disclosure for the activatable device to include any device that can be activated by activation trigger 26.

Advantageously, tool 10 is configured so that—regardless of whether activation trigger 26 is in the normal position or the activation position—battery 22 is prevented activating hydraulic unit 24 unless trigger lockout 12—in the form of the electrical reset lockout—is depressed.

Thus in some embodiments, tool 10 is configured so that inadvertent activation of tool 10 is prevented by requiring simultaneous pressing of lockout 12 and activation of trigger 26.

In other embodiments, tool 10 further includes a control circuit 50 that provides a predetermined time period after pressing lockout 12 during which activation of trigger 26 activates jaw 20. In this manner, the user can press lockout 12 then activate trigger 26 within the predetermined period of time. The control circuit 50 can be configured to be active for only one movement of activation trigger 26 or for multiple movements within the time period. The control circuit 50 can be solid state, digital, hardware, software, or any combinations thereof. Moreover, it is contemplated by the present disclosure for tool 10 to be user programmable to adjust one or more aspects of the control circuit 50.

Drain trigger 28 similarly moves between a normal position (shown) and a depressed or activated position (not shown). Once jaw 20 has completed the action, moving drain trigger 28 from the normal position to the activated position, relieves the pressure (i.e., potential energy) within hydraulic unit 24 allowing jaw 20 to retract.

It should be recognized that tool 10 is described above with respect to FIGS. 1 and 2 as a battery activated hydraulic tool with a pistol grip style handle and a C-head crimping tool. Of course, it is contemplated by the present disclosure for tool 10 to be any type of trigger activated tool such as, but not limited to, crimping tools, both C-Head and jaw styles, cutter tools, and others. Additionally, tool 10 can have any power source such as, but not limited to, a battery power, line power, hydraulic power, pneumatic power, and any combinations thereof. Moreover, tool 10 can have a handle with any grip style such as, but not limited to, pistol style or inline style.

Figure 3:
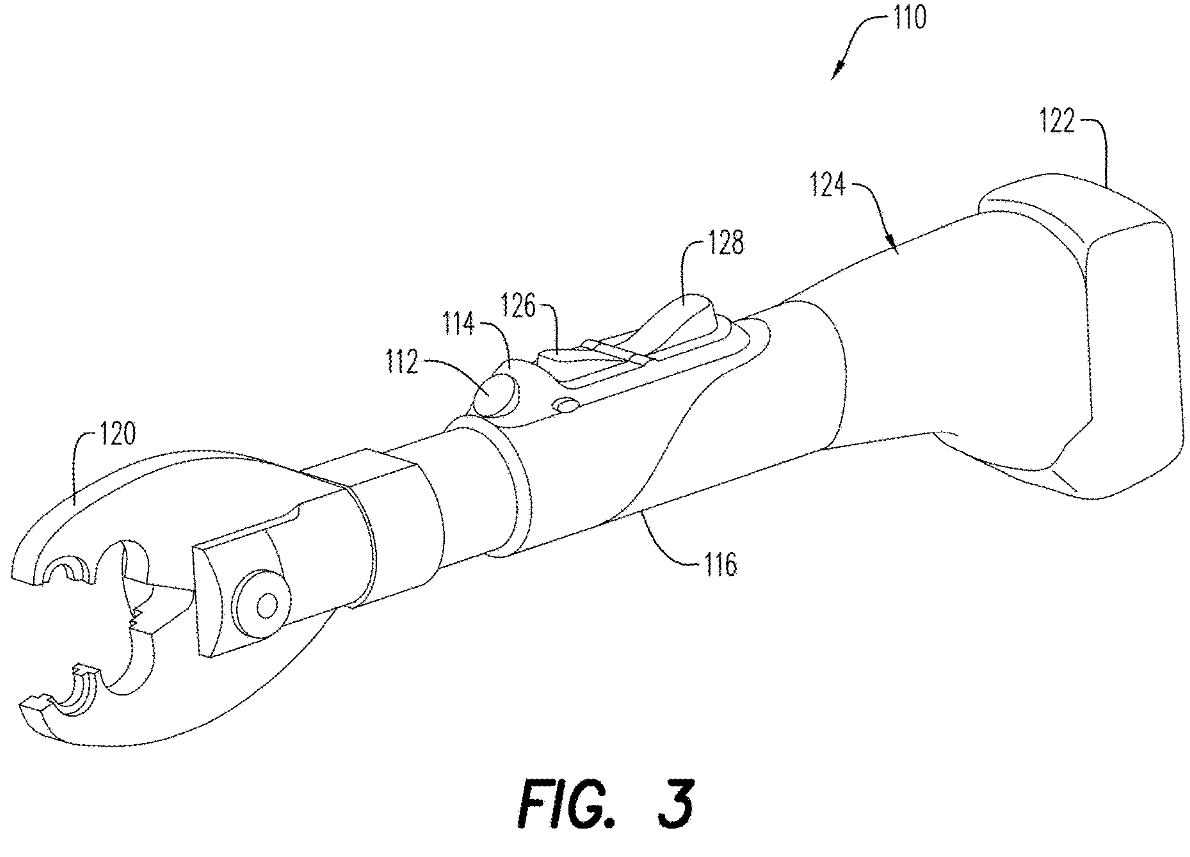
FIG. 3 is a top perspective view of an inline style trigger activated tool having an exemplary embodiment of an electrical reset lockout according to the present disclosure.

For example, the tool is illustrated in FIG. 3 as an inline style trigger activated tool 110. Here, component parts performing similar or analogous functions are labeled in multiples of one hundred.

Tool 110 includes activation lockout 112 positioned at an upper wall 114 of inline style grip 116. Tool 110 further includes a jaw 120, a battery 122, and a hydraulic unit 124. Hydraulic unit 124 includes a three-position switch that includes an activation trigger 126 and a drain trigger 128—which move among a normal position (shown), an activated position (not shown) in which trigger 126 is depressed, and a drain position (not shown) in which trigger 128 is depressed.

As discussed above, tool 110 can be configured so that inadvertent activation of the tool is prevented by requiring simultaneous pressing of lockout 112 and activation of trigger 126. Alternately and as also discussed above, tool 110 can include a control circuit (not shown) that provides a predetermined time period after pressing lockout 112 during which activation of trigger 126 activates jaw 120.

Thus lockouts 12, 112 of FIGS. 1-3 are electronic resets that prevent inadvertent activation of tool 10, 110, respectively, by preventing movement of trigger 26, 126 to the activation button from activating hydraulic unit 24, 124 unless the electronic resets have been pressed.

Figure 4:
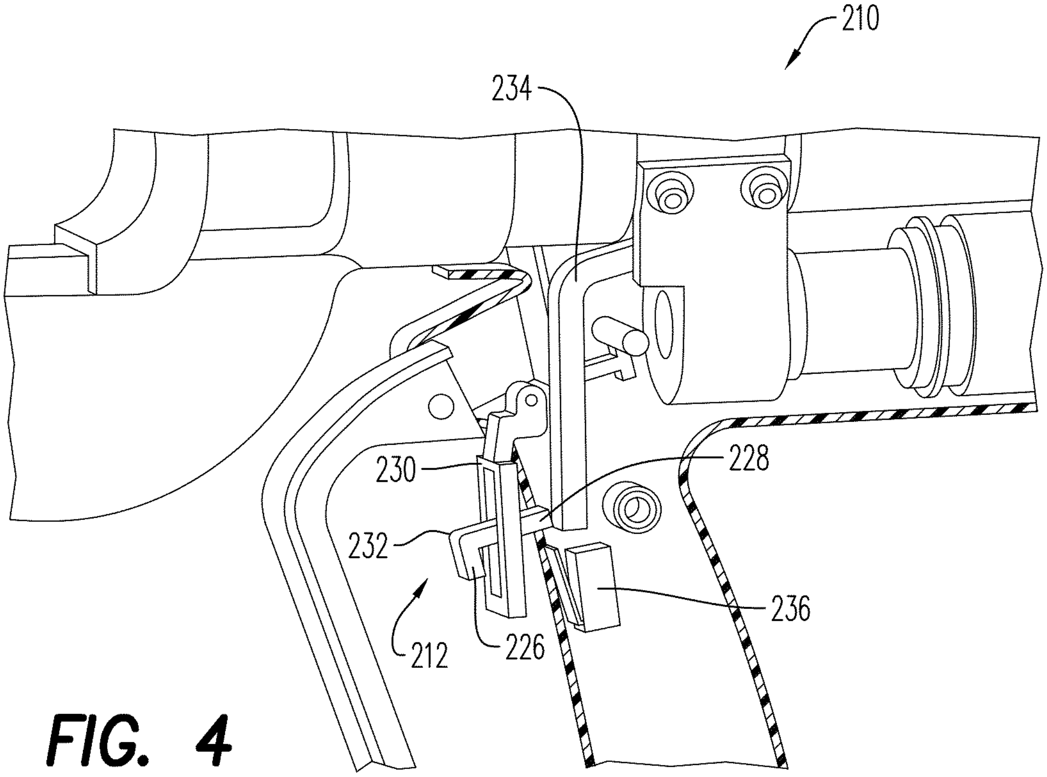
FIG. 4 is a top perspective view of a pistol style trigger activated tool having an exemplary embodiment of a variable position lockout according to the present disclosure, where the variable position lockout is shown in a first or locked position.
Figure 5:
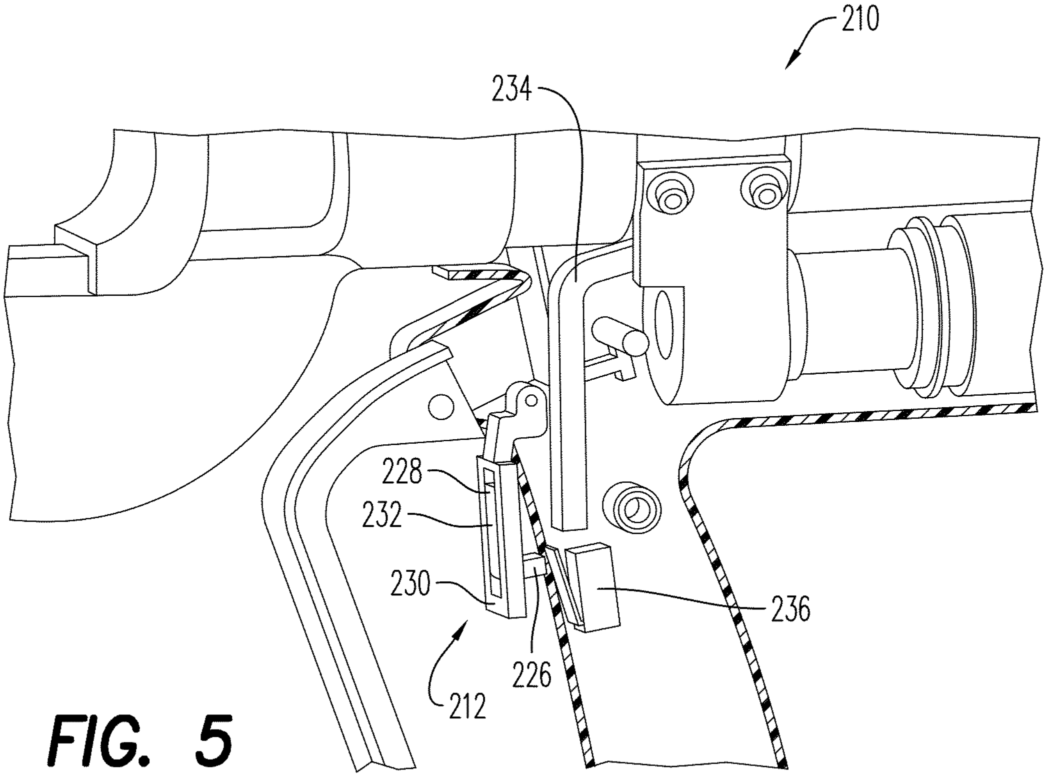
FIG. 5 is a top perspective view of the pistol style trigger activated tool of FIG. 4 having the variable position lockout shown in a second or unlocked position.
Figure 6:
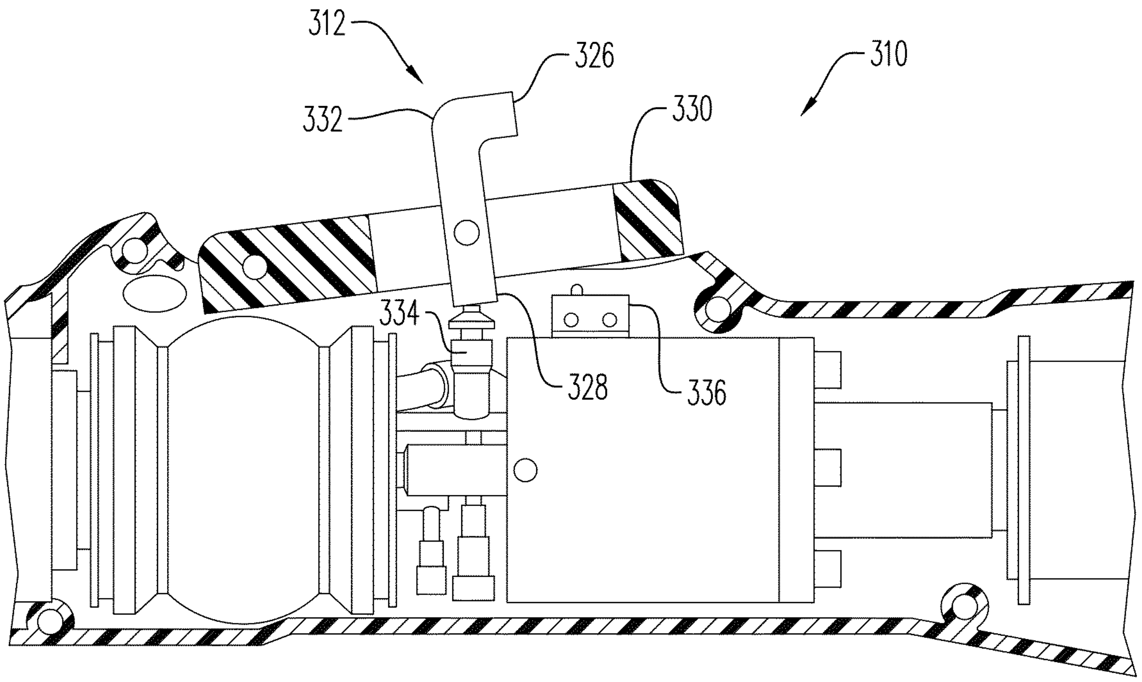
FIG. 6 is a top perspective view of an inline style trigger activated tool having an exemplary embodiment of a variable position lockout according to the present disclosure shown in a first or locked position.
Figure 7:
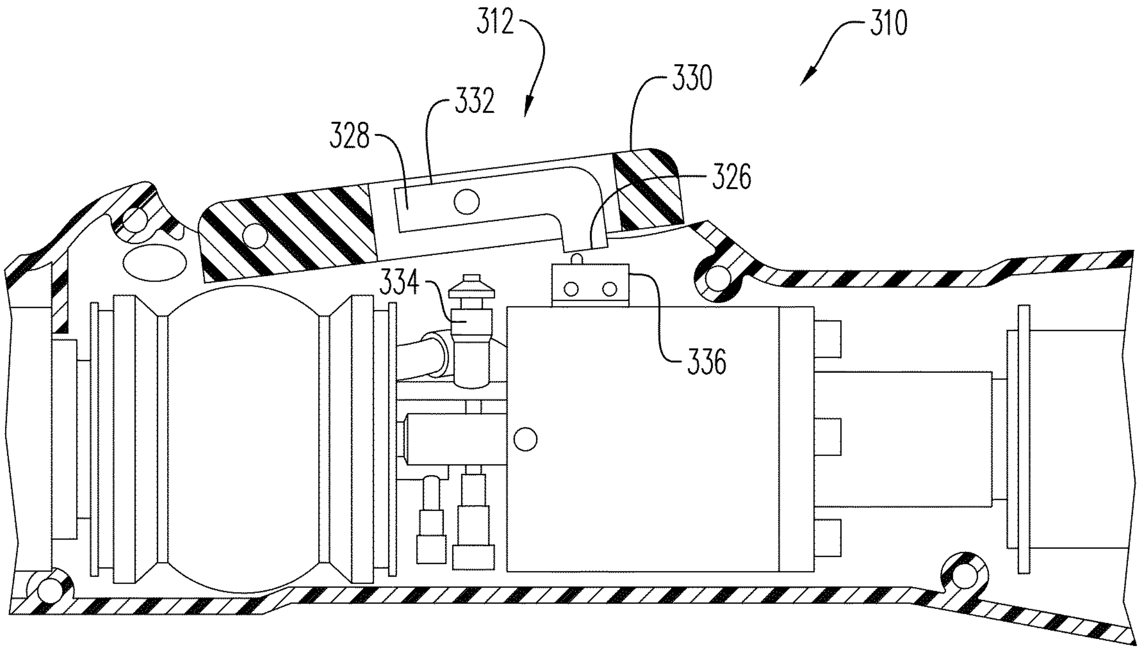
FIG. 7 is a top perspective view of the inline style trigger activated tool of FIG. 6 having the variable position lockout shown in a second or unlocked position.

Alternate embodiments of trigger lockouts 212, 312 that prevent inadvertent activation of the tool are described in use with a pistol grip style tool 210 with respect to FIGS. 4-5 and in use with an inline style grip tool 310 with respect to FIGS. 6-7, respectively. However, since the operation and structure of trigger lockout 312 will be appreciated upon description of trigger lockout 212, the discussion below will be directed only to the trigger lockout 212.

Trigger lockout 212 takes the form of a variable position lockout, which also functions as the activation and deactivation trigger for tool 210.

Specifically, trigger lockout 212 has a trigger lever 230 and an L-shaped lever 232. Trigger lever 230 is pivotally secured to tool 210 for movement for movement between a normal position (FIGS. 4-5) and a depressed position (not shown). L-shaped lever 232 is rotationally secured to trigger lever 230 for movement between a first position (FIG. 4) and a second position (FIG. 5). Additionally, L-shaped lever 232 is normally biased to the first position by, for example, a spring (not shown).

L-shaped lever 232 has an activation arm 226 and a drain arm 228. L-shaped lever 232, when in the first position of FIG. 4, is positioned with drain arm 228 aligned with a hydraulic drain lever 234 of tool 210. In this position, movement of trigger lever 230 from the normal position (FIGS. 4-5) to the depressed position will cause drain arm 228 to move hydraulic drain lever 234 to release hydraulic pressure from tool 210. Simply stated, L-shaped lever 232 is normally biased to a safe position in which inadvertent depression of trigger lever 230 will not activate tool 210, but rather will release the hydraulic pressure from within the tool.

Conversely, L-shaped lever 232, when in the second position of FIG. 5, is positioned with activation arm 226 aligned with an activation switch 236 of tool 210. In this position, movement of trigger lever 230 from the normal position (FIGS. 4-5) to the depressed position will cause activation arm 226 to contact and, thus, activate activation switch 236 to activate tool 210. Simply stated, the biasing of L-shaped lever 232 to the safe position (FIG. 4) can be overcome so that depression of trigger lever 230 activates tool 210.

Accordingly, tool 210 is configured, by way of lockout 212 in the form of the variable position lockout, to require the operator to rotate L-shaped lever 232 from the normally biased first position to the second position then to move trigger lever 230 from the normally biased normal position to the depressed position to activate the tool. Further, tool 210 is configured, by way of lockout 212 in the form of the variable position lockout, to require the operator to return L-shaped lever 232 to the normally biased first position after activation, then to move trigger lever 230 from the normally biased normal position to the depressed position to drain and retract the tool.

Figure 8:
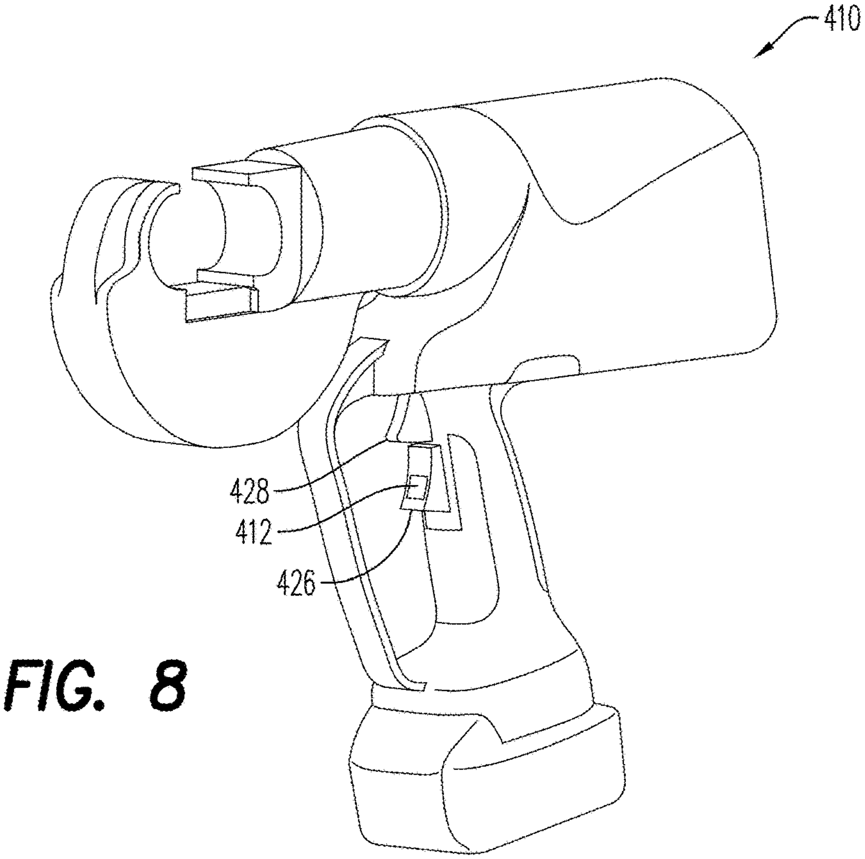
FIG. 8 is a top perspective view of a pistol style trigger activated tool having an exemplary embodiment of a mechanical lockout according to the present disclosure.
Figure 9:
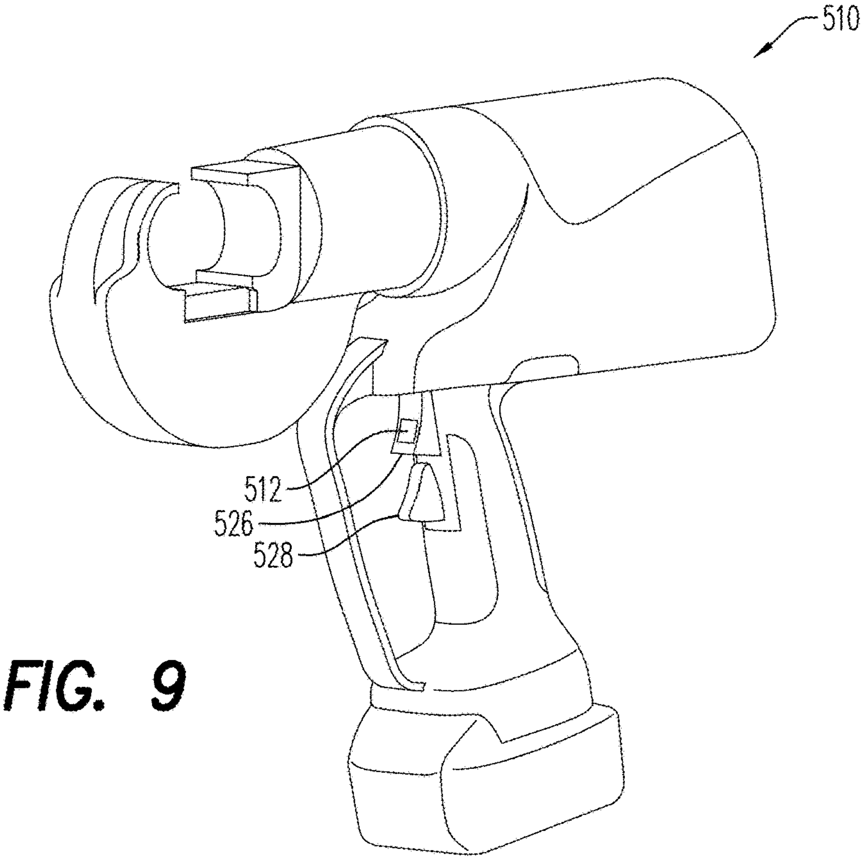
FIG. 9 is a top perspective view of an alternate exemplary embodiment of the mechanical lockout of FIG. 8.

Other alternate embodiments of trigger lockouts 412, 512, 612, 612' that prevent inadvertent activation of the tool are described in use with pistol grip style tools 410, 510 with respect to FIGS. 8-9 and in use with an inline style grip tools 610, 610' with respect to FIGS. 10-14, respectively. However, since the operation and structure of trigger lockouts 512, 612 will be appreciated upon description of trigger lockout 412, the discussion below will be directed only to the trigger lockout 412.

Trigger lockout 412 takes the form of a mechanical lockout, which prevents movement of activation trigger 426 of tool 410. Specifically, trigger lockout 412 can move between a normal or safe position (FIG. 8) and an activation position (not shown). In the normal or safe position, trigger lockout 412 provides a mechanical interference between activation trigger 426 and tool 410 to prevent movement of the activation trigger. Regardless of the position of trigger lockout 412, drain trigger 428 can move between its normal position (FIG. 8) and its drain position (not shown). In this manner, trigger lockout 412 prevents inadvertent activation of tool 410.

It should be recognized that tool 410 is shown in FIG. 8 having activation trigger 426 positioned below drain trigger 428. Of course, it is contemplated by the present disclosure for the activation and drain triggers to have any desired position with respect to one another. For example, tool 510 is shown in FIG. 9 having activation trigger 526 positioned above drain trigger 528, while otherwise functioning as described above with respect to tool 410. Thus, trigger lockout 512 provides a mechanical interference between activation trigger 526 and tool 510 to prevent inadvertent activation of the tool.

Figure 10:
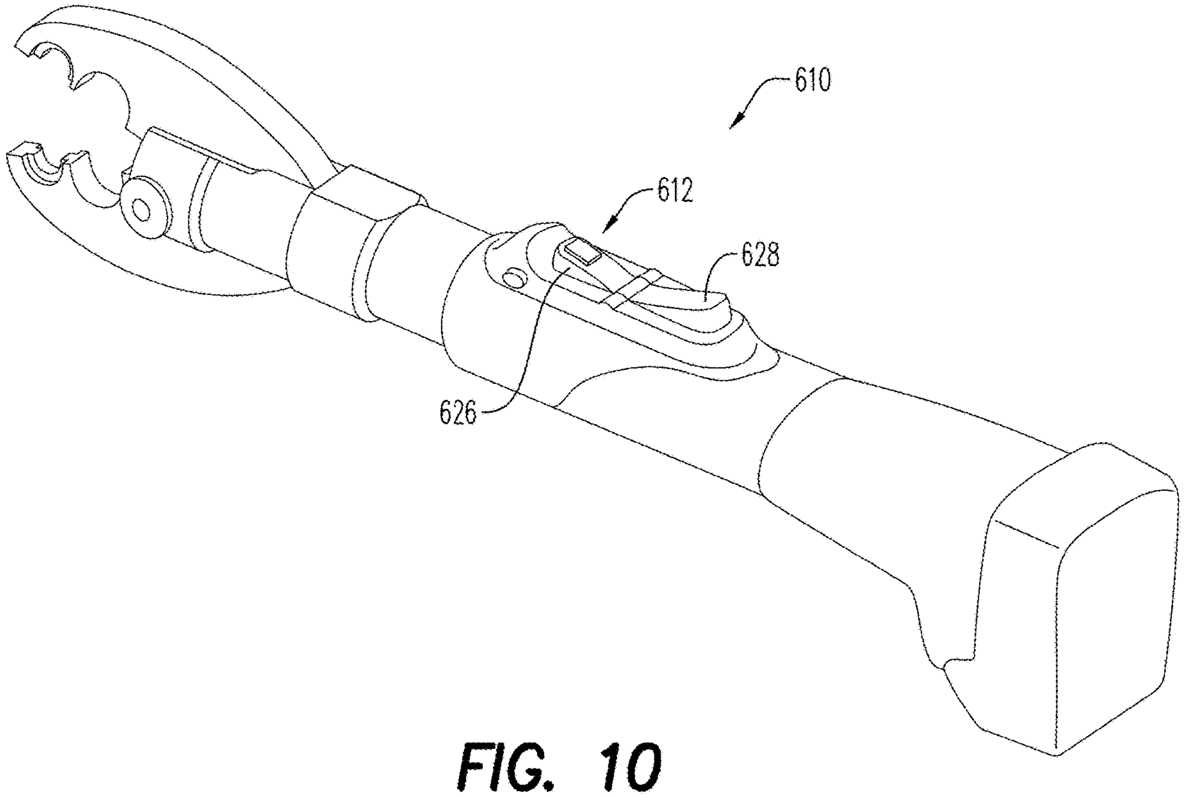
FIG. 10 is a top perspective view of an inline style trigger activated tool having an exemplary embodiment a mechanical lockout according to the present disclosure.

Tool 610 is shown in FIG. 10 as an inline style tool. Tool 610— much like tool 110 discussed above—includes a three-position switch that includes activation trigger 626 and drain trigger 628—which move among a normal position (shown), an activated position (not shown) in which trigger 626 is depressed, and a drain position (not shown) in which trigger 628 is depressed. Thus, trigger lockout 612 provides a mechanical interference between activation trigger 626 and tool 610 to prevent inadvertent activation of the tool.

Another exemplary embodiment of an inline tool 610' is shown in FIGS. 11-14 as an inline style tool. Again, tool 610'— much like tool 110 discussed above—includes a three-position switch that includes activation trigger 626' and drain trigger 628'. Activation trigger 626' moves between a normal position (FIGS. 11-13) and an activated position (FIG. 14) in which the activation trigger 626 is depressed, while drain trigger 628' moves between a normal position (FIGS. 11-14) and a drain position (not shown) in which the drain trigger is depressed.

Figure 13:
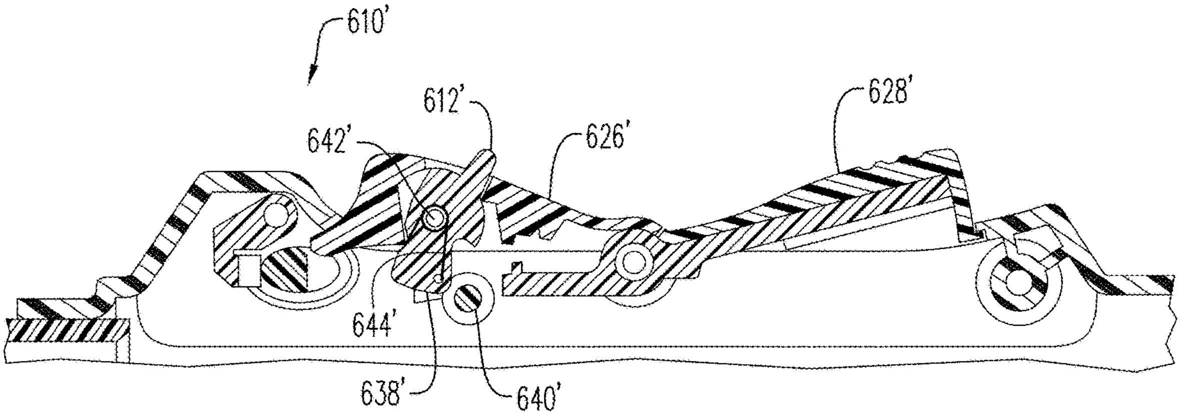
FIG. 13 is a sectional view of the mechanical lockout of FIG. 11 shown in the unlocked position.
Figure 14:
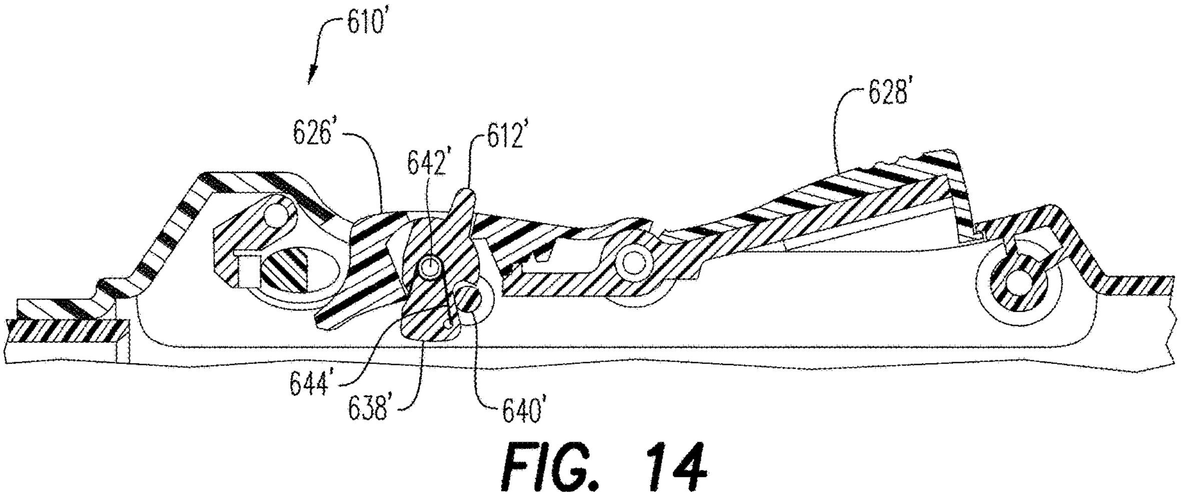
FIG. 14 is a sectional view of the mechanical lockout of FIG. 11 shown in the unlocked position, but with the trigger in the activated position.

Tool 610' includes another exemplary embodiment of mechanical lockout 612', which is configured to prevent inadvertent movement of activation trigger 626'. Here, mechanical lockout 612' is configured to move between a normal or safe position (FIGS. 11-12) and an activation position (FIGS. 13-14). In the normal or safe position, lockout 612' is configured to provide a mechanical interference or abutment between a portion 638' of the lockout and a portion 640' of tool 610' to prevent movement of the activation trigger to the activated position. However in the activation position, portion 638' of lockout 612' no longer interferes or abuts portion 640' of tool 610' to allow movement of activation trigger 626' to the activated position.

Figure 11:
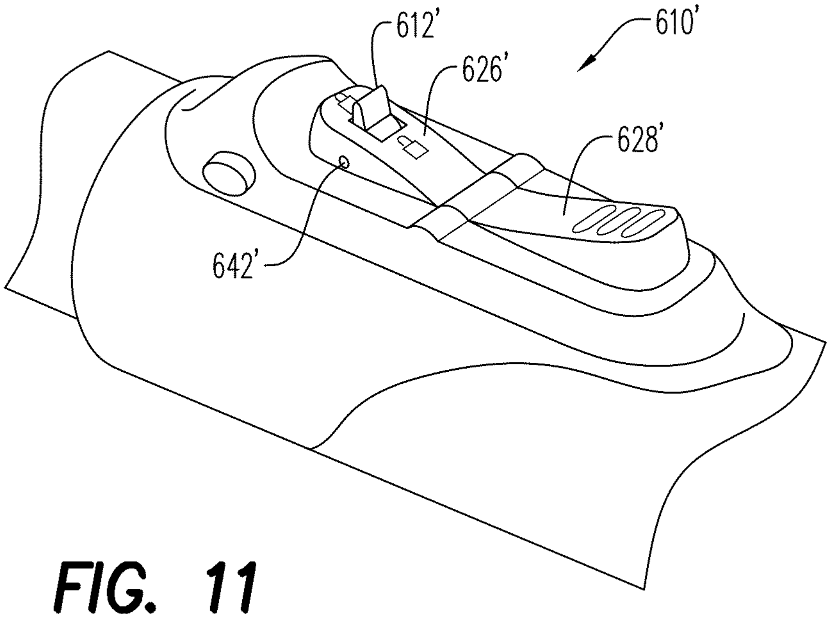
FIG. 11 is a top perspective view of a portion of an inline style trigger activated tool having an exemplary embodiment of a mechanical lockout according to the present disclosure.
Figure 12:
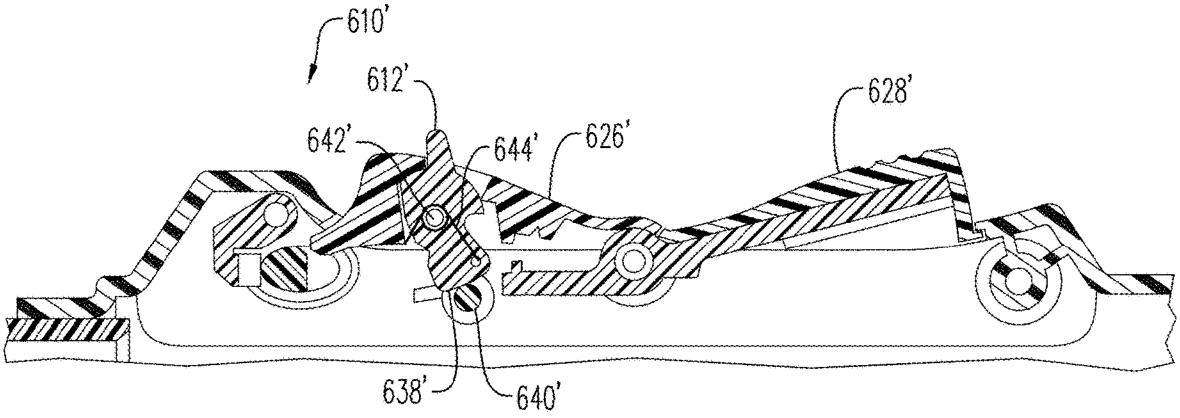
FIG. 12 is a sectional view of the mechanical lockout of FIG. 11 shown in the locked position.

In the illustrated embodiment, lockout 612' is rotatably secured to activation trigger 626' about a shaft 642' and is normally biased about the shaft by a spring 644' to the normal or safe position of FIGS. 11-12. In this manner, tool 610' is configured to require the operator to rotate lockout 612' about shaft 642' from the normally biased safe position (FIGS. 11-12) by overcoming the force of spring 644' to the activation position (FIGS. 13-14). Upon release of pressure from lockout 612', spring 644' will bias the lockout to rotate about shaft 642' back to the normal or safe position However, once lockout 612' is in the activation position, activation trigger 626' can be moved from the normally biased normal position (FIGS. 11-13) to the depressed position (FIG. 14) to activate the tool.

Regardless of the position of lockout 612', drain trigger 628' can move between its normal position (FIGS. 11-14) and its drain position (not shown). In this manner, mechanical lockout 612' is configured to prevent inadvertent activation of tool 610' by requiring movement of lockout 612' to the activation position before movement of trigger 626' to the activation position.

Figure 15:
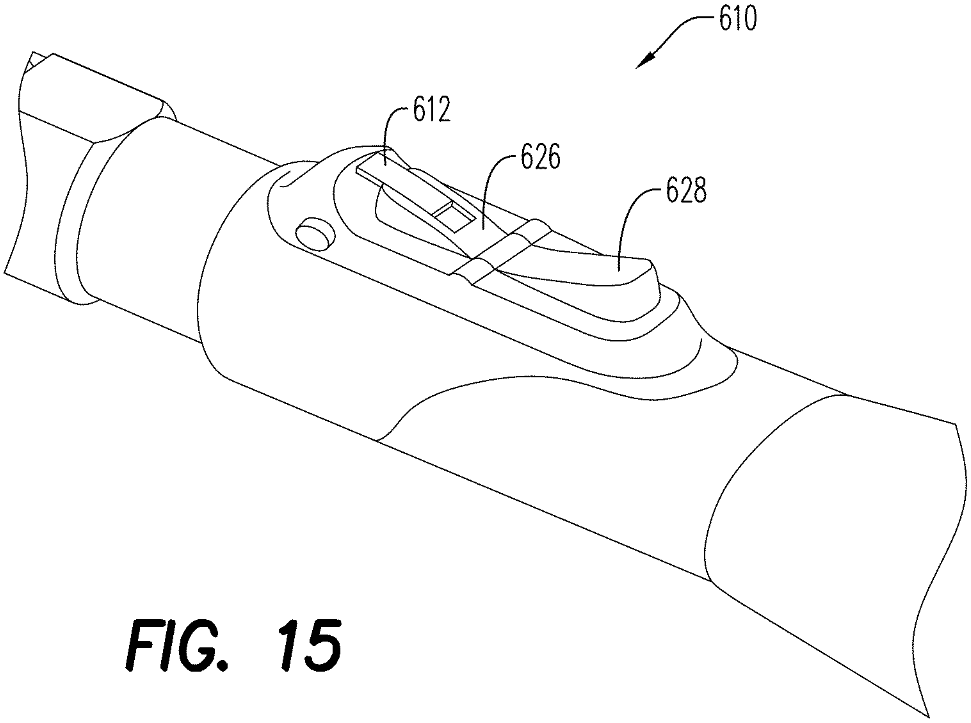
FIG. 15 is a top perspective view of an inline style trigger activated tool having an another exemplary embodiment a mechanical lockout according to the present disclosure, the mechanical lockout being shown in a first or locked position.
Figure 16:
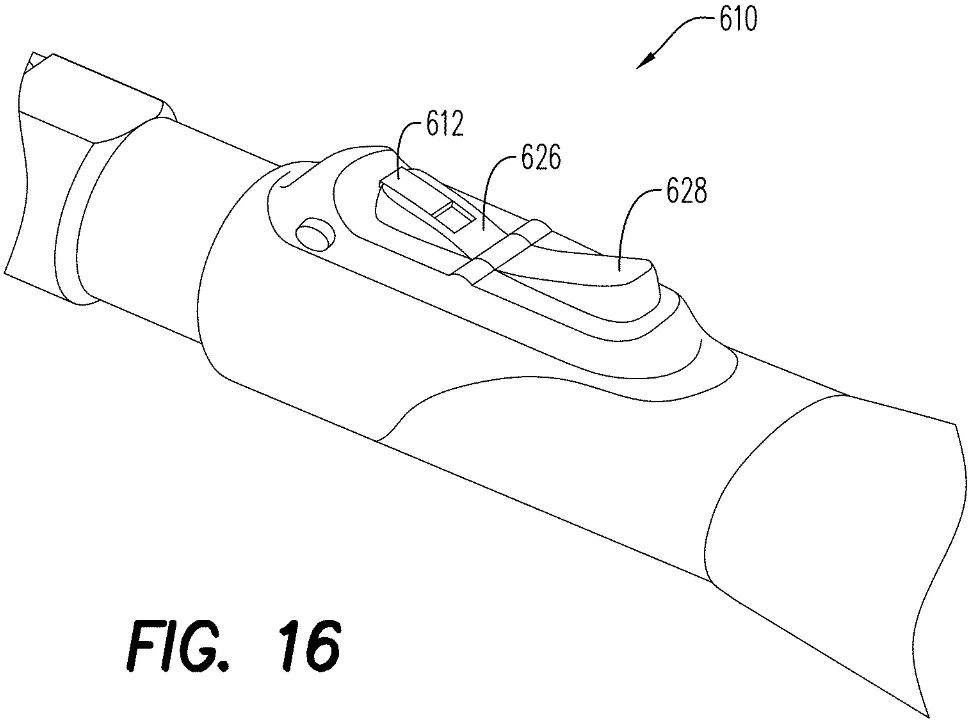
FIG. 16 is a top perspective view of the mechanical lockout of FIG. 15 shown in a second or unlocked position.

It should also be recognized that trigger lockouts 612, 612' are described above with respect to FIGS. 10-14 as forming mechanical interferences with tools 610, 610', respectively, inside of the tool. However, it is also contemplated for trigger lockouts 612, 612' to form the mechanical interference external to the tool as shown in FIGS. 15-16.

Figure 17:
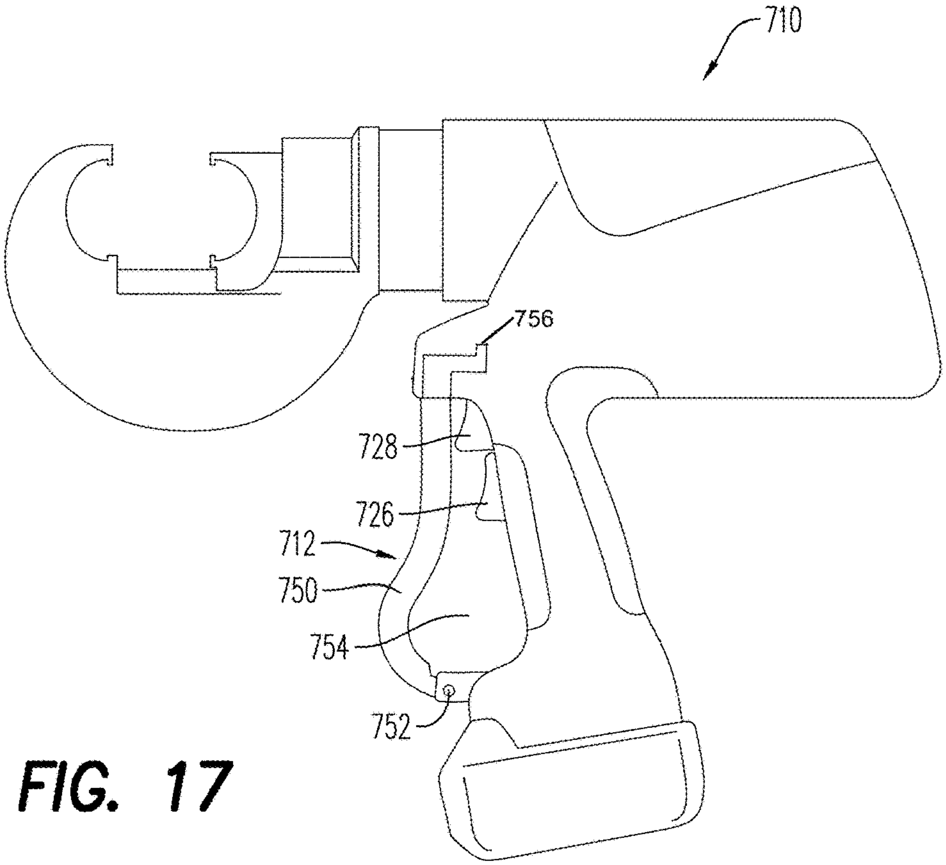
FIG. 17 is a top perspective view of a pistol style trigger activated tool having an exemplary embodiment of a shield lockout shown according to the present disclosure, the shield lockout being shown in a first or shielded position.
Figure 18:
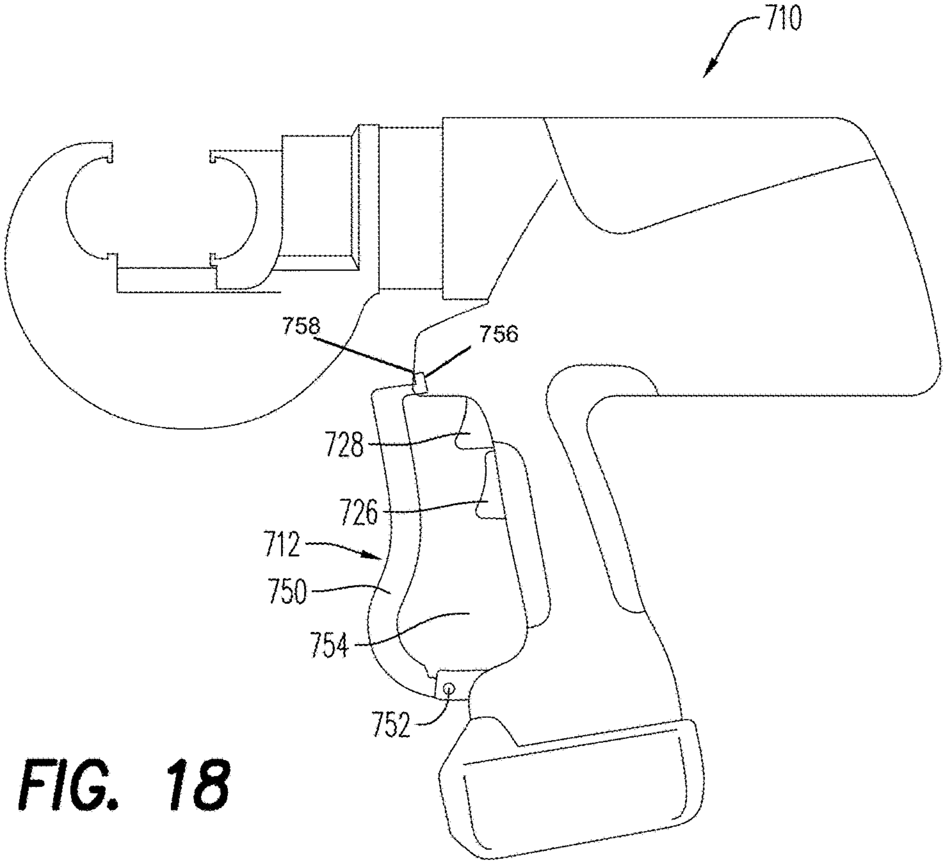
FIG. 18 is a top perspective view of the shield lockout of FIG. 17 shown in a second or unshielded position.
Figure 19:
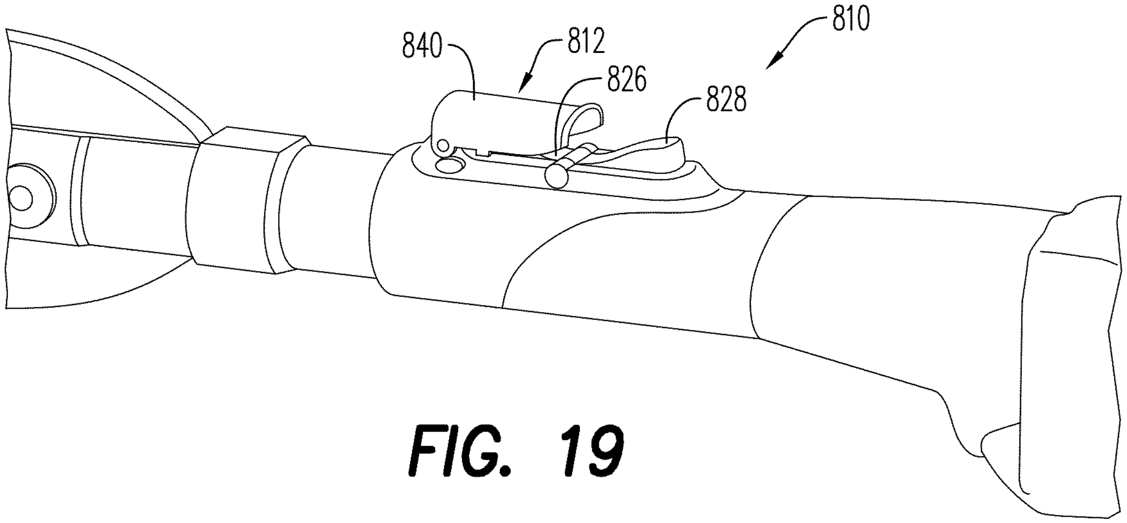
FIG. 19 is a top perspective view of an inline style trigger activated tool having an exemplary embodiment of a shield lockout shown according to the present disclosure, the shield lockout being shown in a first or shielded position.
Figure 20:
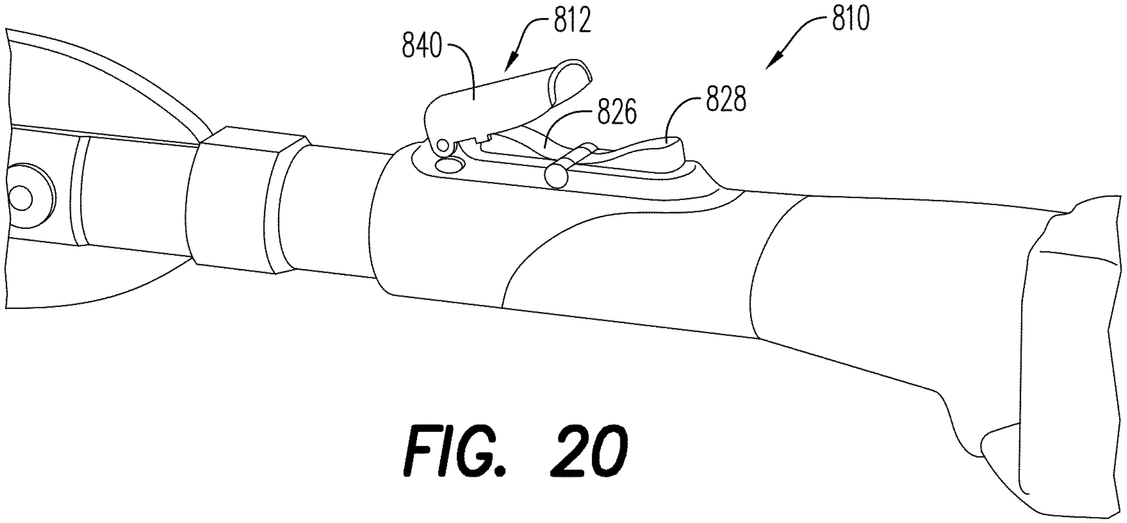
FIG. 20 is a top perspective view of the shield lockout of FIG. 19 shown in a second or unshielded position.

Alternate embodiments of trigger lockouts 712, 812 that prevent inadvertent activation of the tool are described in use with a pistol grip style tool 710 with respect to FIGS. 17-18 and in use with an inline style grip tool 810 with respect to FIGS. 19-20, respectively.

Trigger lockouts 712, 812 take the form of a shield lockout, which shield or otherwise cover the activation trigger for tools 710, 810, respectively to prevent inadvertent activation of the tool.

In tool 710, trigger lockout 712 includes a swiveling guard 750 that moves between a first or guarded position (FIG. 17) and a second or un-guarded position (FIG. 18). In the first or guarded position, swivel guard 750 is close enough to activation trigger 726 to not allow the trigger to be inadvertently activated. In contrast, swivel guard 750, when in the second or un-guarded position, provides sufficient clearance between the swivel guard and activation trigger 726 to allow tool 710 to easily be activated.

Swivel guard 750 has a pivot point 752 that includes a spring (not shown), which is configured to bias the guard to the first or guarded position. In some embodiments, swivel guard 750 is shaped to define an opening 754 below activation and drain triggers 726, 728, where the opening is sufficient to provide an area below the triggers sufficient to receive the fingers or hand of the user to swivel the guard. In other embodiments, swivel guard 750 can also include maximum position limiter 756, which limits the maximum rotation of the swivel guard to the second position. In the illustrated embodiment, limiter 756 includes a hook or other interference structure that catches or abuts a portion of tool 710 to limit the movement of swivel guard 750.

In operation, the user can slide their hand or fingers into opening 754, which will cause swivel guard 750 to move from the first position to the second position. Then, the user can depress activation trigger 726 to activate and/or drain trigger 728 to deactivate tool 710.

In tool 810, trigger lockout 812 includes a pivoting cover guard 840 that moves between a first or guarded position (FIG. 19) and a second or un-guarded position (FIG. 20). In the first or guarded position, pivoting cover guard 840 is close enough to activation trigger 826 to not allow the trigger to be inadvertently activated. In contrast, pivoting cover guard 840, when in the second or un-guarded position, provides sufficient clearance between the pivoting cover guard and activation trigger 826 to allow tool 810 to easily be activated.

Pivoting cover guard 840 has a pivot point 842 that includes a spring (not shown), which is configured to bias the guard to the first or guarded position.

In operation, the user can slide their hand or fingers under pivoting cover guard 840 to move the guard from the first position to the second position. Then, the user can depress activation trigger 826 to activate tool 810.

It should be recognized that lockouts 12, 112 of FIGS. 1-3, illustrated as electronic resets, are shown without any of the variable position lockouts, mechanical lockouts, and shield lockouts of FIGS. 4-20. Of course, it is contemplated by the present disclosure for the trigger activated tools of the present application to include both the electronic reset and one of the variable position lockouts, mechanical lockouts, and shield lockouts.

Additionally, it should be recognized that tool 510 of FIG. 9—that has trigger lockout 512 in the form of a mechanical interference—is the only embodiment of the pistol style tool illustrated having activation trigger 526 above drain trigger 528. Of course, it is contemplated by the present disclosure for any of the other disclosed activation lockouts such as the electronic resets, variable position lockouts, and shield to find equal use with upper activation trigger embodiments.

It should also be noted that the terms “first”, “second”, “third”, “upper”, “lower”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A trigger activated tool, comprising:

a handle portion;

an activatable device including a power source;

an activation trigger depending from the handle portion, the activation trigger being configured for movement between a non-activated position in which the power source is not in communication with the activatable device and an activated position in which the power source is in communication with the activatable device;

a drain trigger depending from the handle portion, the drain trigger being movable between a normal position in which hydraulic pressure is maintained in the activatable device and a drain position in which the hydraulic pressure is relieved from the activatable device; and a guard depending from the handle portion, the guard pivots about a pivot point on the handle between a guarded position and an un-guarded position, wherein the guard, when in the guarded position, is positioned with respect to the activation trigger to not allow the activation trigger to be moved to the activated position, but, when in the un-guarded position, is positioned with respect to the activation trigger to allow the activation trigger to be moved to the activated position, and wherein the guard has a maximum position limiter at an end of the guard that is opposite the pivot point, the maximum position limiter includes an interference structure that catches or abuts a portion of the tool that is internal to the handle portion to limit a maximum rotation of the guard in the unguarded position.

2. The trigger activated tool of claim 1, wherein the handle portion comprises a pistol grip.

3. The trigger activated tool of claim 2, wherein the guard is a swivel guard.

4. The trigger activated tool of claim 3, wherein the swivel guard further comprises a spring that biases the swivel guard to the guarded position.

5. The trigger activated tool of claim 3, wherein the swivel guard defines an opening below the activation and drain triggers, wherein the opening provides an area below the activation and drain triggers.

6. The trigger activated tool of claim 1, wherein the handle portion comprises an inline grip.

7. The trigger activated tool of claim 6, wherein the guard is a pivot guard.

8. The trigger activated tool of claim 1, wherein the activatable device comprises a jaw and a hydraulic drive unit operatively connected with the jaw.

9. The trigger activated tool of claim 8, wherein the power source is a battery.

10. The trigger activated tool of claim 8, wherein the jaw comprises a crimping jaw or cutting jaw.

11. The trigger activated tool of claim 1, further comprising an electrical reset lockout having a locked state and an unlocked state and a control circuit in communication with the electrical reset lockout, wherein the electrical reset lockout is configured so that, regardless of whether the activation trigger is in the activated or non-activation position, the electrical reset lockout prevents activation of the activatable device unless the electrical reset lockout is in the unlocked state.

12. The trigger activated tool of claim 11, wherein the control circuit provides a predetermined time period after movement of the electrical reset lockout to the unlocked state during which movement of the activation trigger from the non-activated position to the activated position activates the activatable device.

13. The trigger activated tool of claim 11, wherein the electrical reset lockout prevents activation of the tool without simultaneous movement of the activation trigger to the activated position and changing of the electrical reset lockout to the unlocked state.

14. The trigger activated tool of claim 11, wherein the handle portion comprises a pistol style grip, and wherein the electrical reset lockout is positioned on an upper wall of the pistol style grip.

15. The trigger activated tool of claim 11, wherein the handle portion comprises a pistol style grip, and wherein the electrical reset lockout is positioned on a side wall of the pistol style grip.

16. The trigger activated tool of claim 11, wherein the handle portion comprises a pistol style grip, and wherein the electrical reset lockout is positioned on both opposite side walls of the pistol style grip.

17. The trigger activated tool of claim 11, wherein the control circuit comprises a solid state circuit, a digital circuit, hardware, software, and any combinations thereof.

18. The trigger activated tool of claim 11, wherein the control circuit is programmable by a user.

19. The trigger activated tool of claim 11, further comprising a three-position switch that includes the activation trigger and the drain trigger.

20. The trigger activated tool of claim 19, wherein the electrical reset lockout is positioned on the handle portion of the inline grip between the three-position switch and the jaw.

21. A trigger activated tool, comprising:

a handle portion;

an activation trigger depending from the handle portion, the activation trigger being configured for movement between a non-activated position and an activated position;

a drain trigger depending from the handle portion, the drain trigger being movable between a normal position and a drain position; and a guard depending from the handle portion, the guard pivots about a pivot point on the handle between a guarded position and an un-guarded position, wherein the guard includes an interference structure that catches or abuts a portion of the tool that is internal to the handle portion to limit a maximum rotation of the guard in the unguarded position, wherein the guard, when in the guarded position, is positioned with respect to the activation trigger to not allow the activation trigger to be moved to the activated position, wherein the guard, when in the un-guarded position, is positioned with respect to the activation trigger to allow the activation trigger to be moved to the activated position, and wherein the interference structure depends from the guard at a position between the pivot point and an end of the guard that is opposite the pivot point.

22. The trigger activated tool of claim 21, wherein the interference structure depends from the guard at a position remote from the pivot point.

* * * * *